Aug. 7, 1956  W. A. RAY  2,757,869
CONTROL SYSTEM FOR HEATING LIQUIDS
Filed Aug. 27, 1953
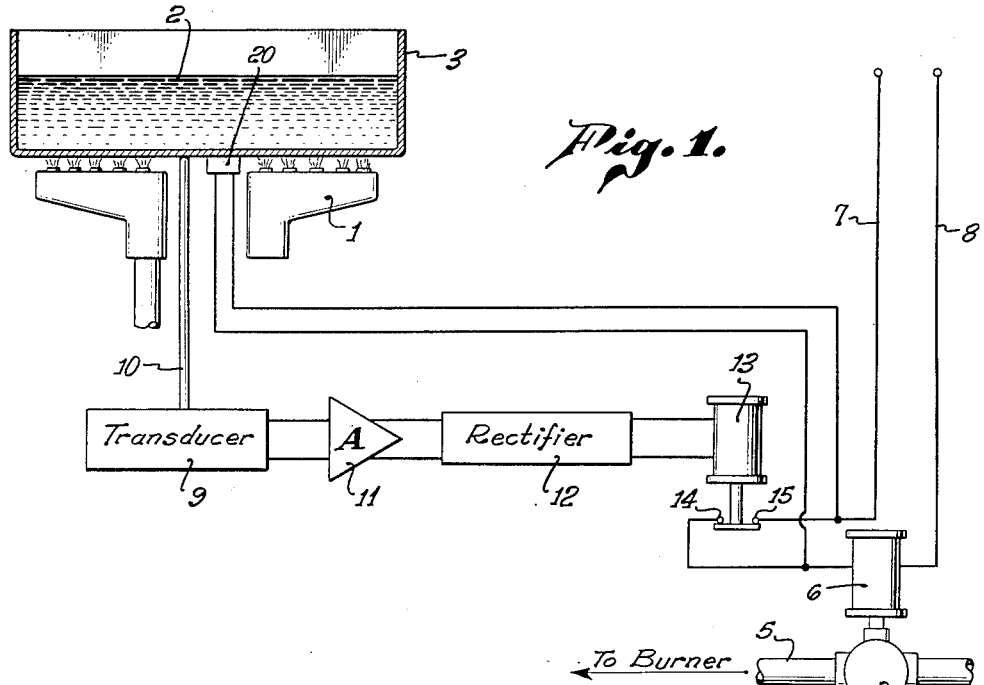
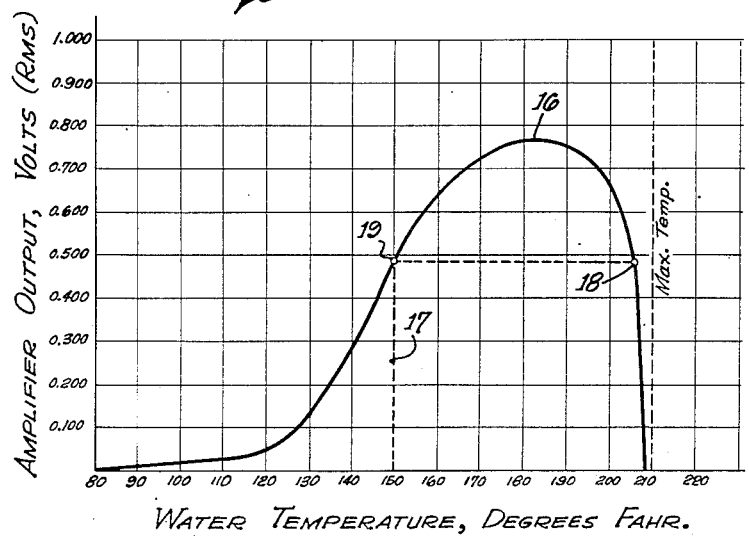
INVENTOR.
WILLIAM A. RAY,
BY
Flam and Flam
ATTORNEYS.

United States Patent Office 2,757,869
Patented Aug. 7, 1956

2,757,869

CONTROL SYSTEM FOR HEATING LIQUIDS

William A. Ray, North Hollywood, Calif., assignor to General Controls Co., a corporation of California Application August 27, 1953, Serial No. 376,789

10 Claims. (Cl. 236—20)

This invention relates to the heating of liquids, and more particularly to a system for controlling the intensity of heat applied to the container for the liquid.

Thermostat controls for such purposes are now well known. Such controls are based entirely upon the temperature attained by the liquid. If it be desired to keep the liquid at or near the boiling point, this type of control is quite likely to result in substantial heat waste. Why this occurs is very easily understood when the factors involving the boiling of liquids are considered.

There are a number of such factors. The elevation above sea level, as well as variations in barometric pressure due to other causes, directly affects the temperature at which boiling occurs. Even a slight change in the composition of the liquid has a marked effect. For example, minor impurities in water, that cannot be removed without considerable expense, alter its boiling point.

Once the boiling point is reached, any excess heat above that required to maintain the liquid at that point is wasted, since the temperature can no longer be elevated. In industrial applications, this type of waste may become intolerable.

It is one of the objects of this invention to provide a control system that automatically reduces the supply of heat when the boiling point is reached, irrespective of the temperature that is required to cause the liquid to boil. It also automatically reestablishes high heat when the liquid ceases to boil. In this way it is feasible to keep the supply of heat very closely to that required to maintain the liquid at its boiling point.

Just prior to the attainment of the boiling point, there is a simmering state. This state corresponds to the formation of incipient bubbles, which are suppressed before they rise to the liquid surface, or when they approach the surface. These bubbles set up a quite pronounced sonic vibration. As soon as full bubbles are formed and broken at the surface, the intensity of vibration is greatly reduced.

It is another object of this invention to make use of this phenomenon to control the rate of heating. For example, a transducer and amplifier are affected by this vibration to maintain the rate of heat at a high value; and when the vibrations reach a low limit, the rate of heat supplied to the liquid is reduced.

By this means, little wasted heat is used; instead, just enough is supplied to keep the liquid at the boiling point, no matter what the required temperature may be to do this.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a diagram of a system incorporating the invention; and

Fig. 2 is a graph explanatory of the mode of operation of the system.

The system incorporates a source of heat which may be of any desired type, such as one utilizing fuel or electrical energy. In the present instance, the source of heat is shown as a gas burner 1. This gas burner 1 is adapted to heat liquid 2 in a container 3 disposed above the burner 1.

Any desired shape or form of container 3 may be provided for accommodating the liquid 2, such as water or the like, which it is desired to maintain at or near the boiling temperature.

The source of fuel for the burner 1 is controlled by the aid of an electromagnetically operated valve 4 controlling the passage of fuel through a conduit 5 to the burner 1. This valve 4 is shown operated by an electromagnet 6 adapted to be energized from mains 7 and 8 in a manner to be hereafter described.

The electromagnet 6 when energized, serves to open the valve 4 to a position corresponding to high-fire. When the electromagnet 6 is deenergized, the valve 4 is positioned to provide low-fire.

The system is so arranged that the vibrations created by the simmering state of the liquid 2 maintains the electromagnet 6 energized. As stated hereinabove, just prior to the boiling point the degree of vibrations created by the simmering is greatly reduced. Accordingly, when the simmer stage approaches a full boiling condition, the electromagnet 6 is caused to be deenergized.

To accomplish this result a transducer 9 is utilized. This transducer translates the vibrations created due to the simmer state to an alternating current. The transducer 9 may, for example, be in the form of an electromagnet with a magnetic circuit formed partly by an element which is vibrated in accordance with the vibrations created by the simmer state. Thus the transducer 9 is provided with a rod 10 in contact with the bottom of the container 3. The container 3 is affected by the vibrations set up by the simmering of the liquid 2.

The relatively minute electromotive forces created in the transducer 9 by the vibrations transmitted to it through the rod 10 is amplified by an amplifier 11. The output of the amplifier 11 is passed to a rectifier 12, which is preferably of the full-wave type. The output of the rectifier 12 serves to energize a relay 13. When energized the relay 13 closes contacts 14 and 15. These contacts are in series with the mains 7 and 8 and electromagnet 6. Accordingly, the valve 4 is maintained in fully opened high-fire position while the electromagnet 13 is energized.

When the simmer state has passed its peak, upon continued heating of the liquid 2, the relay 13 drops out. The simmering effects occur just prior to the time that the liquid 2 is brought to a boiling stage. When the relay 13 drops out, the electromagnet 6 is deenergized and the valve 4 assumes its low-fire position.

The graph of Fig. 2 has for its ordinate the electromotive forces at the output side of the amplifier 11. Its abscissae correspond to the temperature of the liquid. Accordingly, the graph 16 indicates the intensity of the simmering vibrations as the boiling temperatures are reached. It is seen that at low temperatures the vibrations created by simmer are inappreciable. The simmering state becomes quite advanced at about 150° F.

The relay 13 may be so arranged that it will pull in at about 150° temperature corresponding to the ordinate 17. Accordingly, the relay drops out at about a point corresponding to the point 18 of the graph 16, which is close to the boiling temperature. Accordingly, it is only between the two points 19 and 18 of the graph 16 that the relay 13 is energized and full-fire conditions are obtained. Beyond the limits of temperature corresponding to these two points the valve 4 is in low-fire position.

When the temperature recedes from near boiling point to that corresponding to the point 18, relay 13 is again energized and full-fire conditions then prevail.

By this means the intensity of the heating is controlled so as to maintain the liquid 2 at or very near the boiling point, irrespective of the specific temperatures at which the boiling may occur.

When the system is first set into operation, some means must be provided to maintain the electromagnet 6 energized independently of the relay 13, and until the temperature corresponding to ordinate 17 is attained. For this purpose a thermostat 20 in contact with a wall of the container 3 may be utilized. This thermostat closes a circuit through the electromagnet 6 independently of contacts 14 and 15. Beyond the temperature corresponding to ordinate 17, the thermostat 20 opens the circuit through the electromagnet 6. In this way the transducer 9 independently controls the energization of the electromagnet 6 between those portions of the graph 16 represented by points 19 and 18.

The inventor claims:

1. In a liquid heating system: means controlling the rate of heat supplied to the liquid; and means responsive to a substantial reduction of the intensity of vibrations created by a simmer state of the liquid for operating the controlling means to reduce the rate of heat supplied to the liquid.

2. In a liquid heating system: means controlling the rate of heat supplied to the liquid; and a transducer affected by the intensity of vibrations created by the liquid at the simmer state, for operating said controlling means.

3. In a system for supplying heat to a liquid in a container: a transducer affected by the intensity of vibrations of the container created by the simmering of the liquid; and means responsive to the operation of said transducer for controlling the rate of heat supplied to the liquid.

4. In a system for supplying heat to a liquid in a container: a transducer affected by the intensity of vibrations of the container created by the simmering of the liquid; and means responsive to the operation of said transducer for reducing the rate of heat supplied to the liquid when the intensity of the vibrations is reduced.

5. In a liquid heating system: means controlling the rate of heat supplied to the liquid; means responsive to a substantial reduction of vibrations created by a simmer state of the liquid for operating the controlling means to reduce the rate of heat supplied to the liquid; and means responsive to the temperature of the liquid for maintaining a high rate of heat supply until the temperature is increased to a point substantially above the beginning of the simmer state.

6. In a liquid heating system: means controlling the rate of heat supplied to the liquid; a transducer affected by the vibrations created by the liquid at the simmer state, for operating said controlling means; and means responsive to the temperature of the liquid for maintaining a high rate of heat supply until the temperature is increased to a point substantially above the beginning of the simmer state.

7. In a system for supplying heat to a liquid in a container: a transducer affected by vibrations of the container created by the simmering of the liquid; means responsive to the operation of said transducer for controlling the rate of heat supplied to the liquid; and means responsive to the temperature of the liquid for maintaining a high rate of heat supply until the temperature is increased to a point substantially above the beginning of the simmer state.

8. In a system for supplying heat to a liquid in a container: a transducer affected by vibrations of the container created by the simmering of the liquid; means responsive to the operation of said transducer for reducing the rate of heat supplied to the liquid when the intensity of the vibrations is reduced; and means responsive to the temperature of the liquid for maintaining a high rate of heat supply until the temperature is increased to a point substantially above the beginning of the simmer state.

9. In a liquid heating system: means for controlling the rate of heat supplied to the system; and means responsive to a change in the amplitude of sonic vibrations created by application of heat to said liquid for operating said controlling means.

10. In a system for supplying heat to a liquid: means for controlling the rate of heating of said liquid; and means responsive to the temperature and amplitude of sonic vibrations created by application of heat to said liquid for operating said controlling units.

References Cited in the file of this patent
UNITED STATES PATENTS

| | | |
|---|---|---|
| 2,008,400 | Mott | July 16, 1935 |
| 2,017,368 | Magner | Oct. 15, 1935 |
| 2,099,687 | Hartig | Nov. 23, 1937 |